United States Patent
Krishnamurthy et al.

(10) Patent No.: US 8,611,277 B2
(45) Date of Patent: Dec. 17, 2013

(54) RESELECTION IN A WIRELESS COMMUNICATION SYSTEM

(75) Inventors: Sandeep H. Krishnamurthy, Arlington Heights, IL (US); Ravi Kuchibhotla, Gurnee, IL (US); Robert T. Love, Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 906 days.

(21) Appl. No.: 12/489,256

(22) Filed: Jun. 22, 2009

(65) Prior Publication Data

US 2010/0323693 A1 Dec. 23, 2010

(51) Int. Cl.
*H04Q 7/00* (2006.01)

(52) U.S. Cl.
USPC .................................................... 370/328

(58) Field of Classification Search
None
See application file for complete search history.

(56) References Cited

U.S. PATENT DOCUMENTS

| | | | |
|---|---|---|---|
| 5,570,373 A * | 10/1996 | Wing ........................... 455/423 |
| 5,870,426 A * | 2/1999 | Yokev et al. ................. 375/133 |
| 6,539,200 B1 * | 3/2003 | Schiff .......................... 455/12.1 |
| 6,625,132 B1 * | 9/2003 | Boettger et al. ............. 370/329 |
| 6,687,285 B1 * | 2/2004 | Jou ............................... 375/133 |
| 6,795,425 B1 * | 9/2004 | Raith ........................... 370/345 |
| 6,961,583 B2 * | 11/2005 | Moles et al. ............... 455/552.1 |
| 7,047,037 B2 | 5/2006 | Ormson |
| 7,684,373 B2 | 3/2010 | Ekvetchavic et al. |
| 7,805,155 B2 | 9/2010 | Chapman et al. |
| 8,229,432 B2 * | 7/2012 | Fox et al. .................... 455/435.3 |
| 8,301,176 B1 * | 10/2012 | Yellin et al. ................... 455/458 |
| 2001/0034233 A1 * | 10/2001 | Tiedemann et al. .......... 455/436 |
| 2003/0008691 A1 * | 1/2003 | Chen et al. .................... 455/574 |
| 2003/0017842 A1 * | 1/2003 | Moles et al. .................. 455/552 |
| 2004/0071119 A1 * | 4/2004 | Ishikawa et al. ............. 370/335 |
| 2004/0102200 A1 * | 5/2004 | Palkisto et al. ............... 455/466 |
| 2004/0116110 A1 * | 6/2004 | Amerga et al. ............. 455/422.1 |
| 2007/0184836 A1 * | 8/2007 | He ................................. 455/434 |
| 2008/0056198 A1 * | 3/2008 | Charpentier et al. ......... 370/332 |
| 2008/0233950 A1 * | 9/2008 | Kuo ............................... 455/424 |
| 2009/0067386 A1 * | 3/2009 | Kitazoe ......................... 370/332 |
| 2009/0109926 A1 * | 4/2009 | Meylan .......................... 370/331 |
| 2009/0181676 A1 * | 7/2009 | Lee et al. ....................... 455/436 |

(Continued)

FOREIGN PATENT DOCUMENTS

| | | | |
|---|---|---|---|
| JP | 2004-180297 A | 6/2004 |
| JP | 2005-503130 A | 1/2008 |
| JP | 2009-081547 A | 4/2009 |

OTHER PUBLICATIONS

Motorola; "Impact of HeNB interference on paging channel performance", 3GPP Draft; R4092399, 3rd Generation Partnership Project (3GPP), Mobile Competence Centre; 650, Route Des Lucioles; F-06921 Sophia-Antipolis Cedex; France, No. Los Angeles, CA, Jun. 25, 2009, all pages.

(Continued)

*Primary Examiner* — Hassan Phillips
*Assistant Examiner* — Prenell Jones

(57) ABSTRACT

A wireless communication device includes a transceiver coupled to a controller configured to cause the device to receive a downlink transmission including a reference signal from a base station while camped on the base station in idle mode, to estimate a quality metric of a hypothetical paging channel reception based on the reference signal, and to determine perform reselection evaluation of a neighboring base stations based on the estimated quality metric.

24 Claims, 3 Drawing Sheets

(56) References Cited

U.S. PATENT DOCUMENTS

| | | | |
|---|---|---|---|
| 2010/0034092 A1 | 2/2010 | Krishnamurthy et al. | |
| 2010/0130205 A1* | 5/2010 | Jung et al. | 455/435.2 |
| 2010/0202307 A1* | 8/2010 | Lee et al. | 370/252 |
| 2010/0216469 A1* | 8/2010 | Yi et al. | 455/435.3 |
| 2010/0222055 A1* | 9/2010 | Cho et al. | 455/434 |
| 2010/0240367 A1* | 9/2010 | Lee et al. | 455/435.2 |
| 2010/0278146 A1* | 11/2010 | Aoyama et al. | 370/331 |
| 2010/0291956 A1* | 11/2010 | Iwamura et al. | 455/509 |
| 2010/0323693 A1* | 12/2010 | Krishnamurthy et al. | 455/434 |

OTHER PUBLICATIONS

Motorola: "SIR Metric for Idle Mode Reselection Enhancements", 3GPP Draft; R4-094632, 3rd Generation Partnership Project (3GPP), Mobile Competence Centre; 650, Route Des Lucioles; F-06921 Sophia- Antipolis Cedex; France, No. Jeju; Nov. 9, 2009, Nov. 8, 2009, all pages.

Patent Cooperation Treaty, International Search Report and Written Opinion of the International Searching Authority for International Application No. PCT/US2010/036850, Jun. 1, 2010, 13 pages.

3GPP TSG-RAN WG4 #51; May 4-8, 2009; San Francisco, USA; RSRQ Measurement Requirement in Idle Mode; R4-091895, all pages.

3GPP TSG-RAN WG4 #51; May 4-8, 2009; San Francisco, USA; Inter-Frequency Reselection Indicator (IFRI) Simulation Results; R4-091896, all pages.

3GPP TSG-RAN WG2 Meeting #65-BIS; Seoul, Mar. 23-27, 2009; Usage of IFRI With Cell Reselection to CSG Cells; RX-092416, all pages.

3GPP TSG-RAN WG2 Meeting #65-BIS; Seoul, Mar. 23-27, 2009; Idle State RSTQ Measurement and Impact on Paging Performance; R4-091332, all pages.

Japan Patent Office, "Final Notice" for Japanese Patent Application No. 2012-513351 dated Jun. 15, 2013, 4 pages.

* cited by examiner

RESELECTION IN A WIRELESS COMMUNICATION SYSTEM

FIELD OF THE DISCLOSURE

The present invention relates generally to wireless communications and, more particularly, to reselection by an idle mode wireless communication terminal in a wireless communication system based on a signal quality metric measured or estimated at the wireless communication terminal.

BACKGROUND

Some heterogeneous wireless communication networks, for example, 3rd Generation Partnership Project (3GPP) Universal Mobile Telecommunications System (UMTS) Long Term Evolution (LTE) networks, comprise a macro cell-eNB (MeNB) and a home-eNB (HeNB) cell having overlapping bandwidth (BW) deployments that may subject user equipment (UE) to interference. Some HeNBs are closed subscriber groups (CSG) that serve only UE belonging to the Group.

Idle mode reselection behavior for LTE Release 8 (Rel-8) is specified in TS 36.304 v8.5.0. The existing reselection criterion for LTE Rel-8 uses reference signal received power (RSRP) from the serving cell as a mechanism to trigger reselection evaluation of neighboring base stations. This method is effective in recognizing when the UE moves out of a base station coverage area, but the RSRP will not trigger reselection evaluation when the UE is subject to interference from a neighboring base station, for example, when an idle mode UE camped on a MeNB is subject to interference from a neighboring HeNB.

FIG. 1 illustrates a first scenario wherein a UE camped on a MeNB is subject to interference from the HeNB when the UE is located near a HeNB. FIG. 2 illustrates another scenario wherein a UE camped on a HeNB is subject to interference from a MeNB that is located near the HeNB. Such interference may result in a missed page and the associated consequences (e.g., missed network-originated calls, etc.) by an idle mode UE.

R2-092416 entitled "Usage of IFRI with Cell Reselection to CSG cells" describes a mechanism wherein a UE camped on a MeNB attempts to reselect to a different carrier, i.e., performs inter-frequency reselection, upon detecting that an intra-frequency reselection indicator (IFRI) bit is set by a neighboring HeNB, wherein the set IFRI bit indicates that the HeNB and MeNB share a common carrier frequency. It has also been suggested that an idle mode UE camped on the MeNB "bar" the shared carrier frequency for a fixed duration (e.g., 300 sec) from reselection when the IFRI bit is set by the HeNB. In some systems, for example, LTE Release 9 (Rel-9), the SIB transmission must be decoded before the UE can determine whether the IFRI bit is set.

An alternate solution to interference in the scenario of FIG. 1 is to trigger inter-frequency reselection evaluation when the reference signal received quality (RSRQ) of the serving cell or base station falls below a threshold. This proposal however suffers from various drawbacks including, among others, lack of agreement on how to measure interference and the fact that the reliability of paging channel reception is dependent on various factors such as the transmit antenna configuration of the serving base station, the physical downlink control channel (PDCCH) code rate or aggregation level, frequency-dependent interference from the HeNB (eg., due to fractional frequency reuse), etc. resulting in a scenario that the RSRQ is not a good indicator of paging channel performance.

The RSRQ-based proposal although in principle can trigger macro cell UEs (MUEs) with potentially poor paging performance to start inter-frequency reselection evaluations, the RSRQ metric as it is defined in LTE Rel-8 will likely lead to a failure in fulfillment of this objective. The interference measurement used for estimating RSSI in the specification is not well defined (e.g., no specification on which RBs or subframes are used, whether RSRP should be narrowband or wideband, etc.) and as a result, different UE implementations might end up behaving differently. Further, even if all the UEs were to achieve consistency in interference measurement by a specification mandate, the fact that the reliability of paging channel reception is dependent on various factors such as the eNB transmit antenna configuration, PDCCH code rate or aggregation level, frequency-dependent interference from the HeNB (eg. due to fractional frequency reuse), etc. resulting in a scenario that RSRQ is not a good indicator of paging channel performance.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
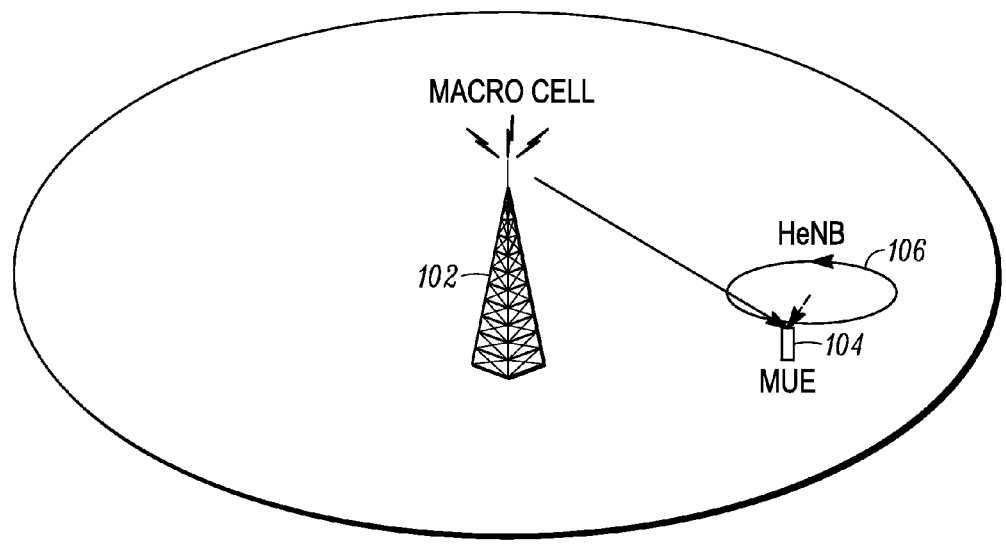
FIG. 1 illustrates a portion of a first prior art wireless communication network.

Wireless communication systems generally comprise one or more fixed base infrastructure units forming a network distributed over a geographical region for serving remote units in the time and/or frequency and/or spatial domain. A base unit may also be referred to as an access point (AP), access terminal (AT), base, base station (BS), Node-B (NB), eNode-B (eNB), Home Node-B (HNB), Home eNode-B (HeNB), relay node (RN), or by other terminology used in the art. The one or more base units each comprise one or more transmitters for downlink (DL) transmissions and one or more receivers for receiving uplink (UL) transmissions. The base units are generally part of a radio access network that includes one or more controllers communicably coupled to one or more corresponding base units. Each access network is generally communicably coupled to one or more core networks, which may be coupled to other networks like the Internet and a public switched telephone network (PSTN) among other networks. These and other elements of access and core networks are not illustrated but are known generally by those having ordinary skill in the art.

The one or more base units of the system each serve a number of remote units within a corresponding serving area, for example, a cell or a cell sector, via a wireless communication link. The remote units may be fixed or mobile. A remote unit may also be referred to as a subscriber unit (SU), mobile, mobile station (MS), user, terminal, subscriber station (SS), user equipment (UE), user terminal (UT), wireless communication device, or by other terminology used in the art. Each remote unit also comprises one or more transmitters and one or more receivers. The remote unit communicates with the base unit via uplink communication signals or transmissions. Sometimes the base unit is referred to as a "serving" or connected or anchor cell for the remote unit. The remote units may have half duplex (HD) or full duplex (FD) transceivers. Half-duplex transceivers do not transmit and receive simultaneously whereas full duplex UE do. The remote units may also communicate with the base unit via a relay node.

In one implementation, the wireless communication system is compliant with the 3GPP Universal Mobile Telecommunications System (UMTS) LTE protocol, also referred to as EUTRA or 3GPP LTE Release-8 (Rel-8) or some later generation thereof, wherein the base units transmit using an orthogonal frequency division multiplexing (OFDM) modulation scheme on the downlink and the user terminals transmit using a single carrier frequency division multiple access (SC-FDMA) scheme on the uplink. More generally the wireless communication system may implement some other open or proprietary communication protocol, for example, WiMAX, among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternative embodiments, the wireless communication system may utilize other communication system protocols including, but not limited to, TDMA or direct sequence CDMA. The communication system may be a TDD (Time Division Duplex) or FDD (Frequency Division Duplex) system.

Figure 2:
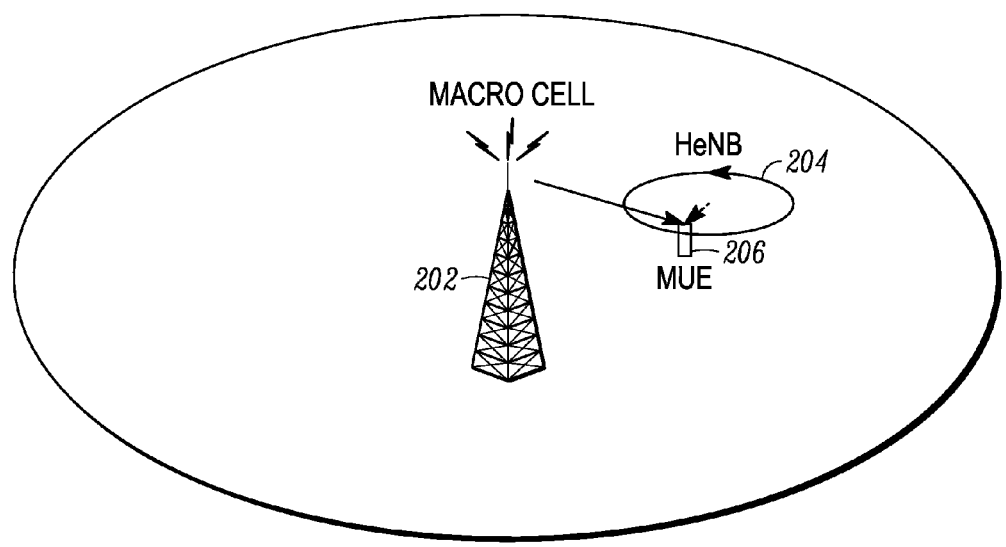
FIG. 2 illustrates a portion of a second prior art wireless communication network.

In FIG. 1, a base station 102, e.g., a MeNB, serves a remote unit 104 within a corresponding serving area, for example, a cell or a cell sector, via a wireless communication link. A remote unit served by a MeNB is also referred to herein as a MUE. FIG. 1 also illustrates a Home eNB (HeNB) 106 located near the MUE, wherein downlink (DL) transmissions by the HeNB interfere with DL transmissions received by the MUE 104. In FIG. 2, a base station 202, e.g., a MeNB, communicates DL transmissions that interfere with DL transmissions from a HeNB 204 that serves a remote unit 206. A remote unit served by a HeNB is also referred to herein as HUE. Some HeNBs are closed subscriber groups (CSG) that serve only UE belonging to the Group. More generally, however, the HeNB may serve any UE within its coverage area. More generally the HeNB in FIGS. 1 and 2 could be another base station.

Figure 3:
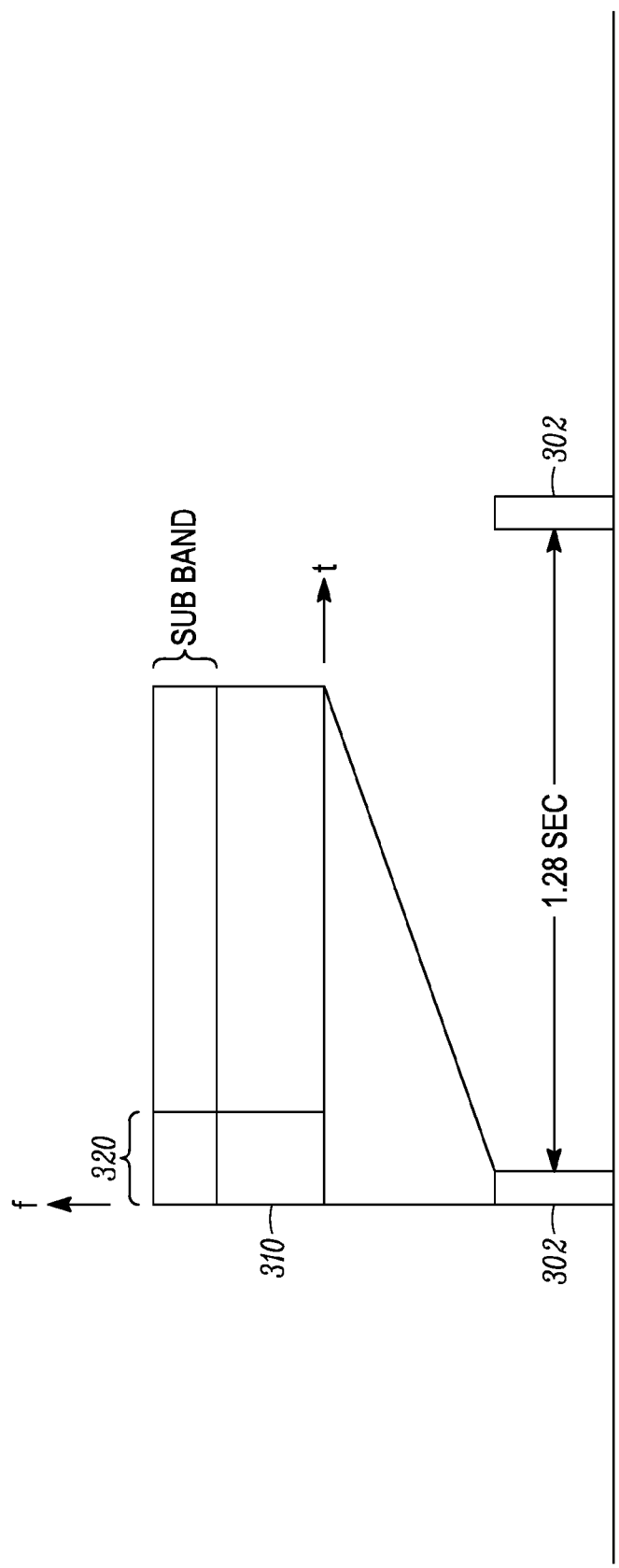
FIG. 3 illustrates a periodic paging signal received by a user terminal operating in idle mode.

Generally, an idle mode UE camped on a base station is configured to receive a paging channel or portion thereof while camped on the base station. For example, in FIG. 1, the MUE 104 is camped on the MeNB 102 and in FIG. 2 the HUE 206 is camped on the HeNB 204. In idle mode, the UE periodically awakes from a power saving sleep mode to detect a paging signal during paging occasions. FIG. 3 illustrates periodic paging occasions 302, wherein each paging occasion comprises at least one sub-frame 310 at least a portion of which is received by the UE during the paging occasions as discussion further below. The exemplary sub-frame has time and frequency dimensions.

Figure 4:
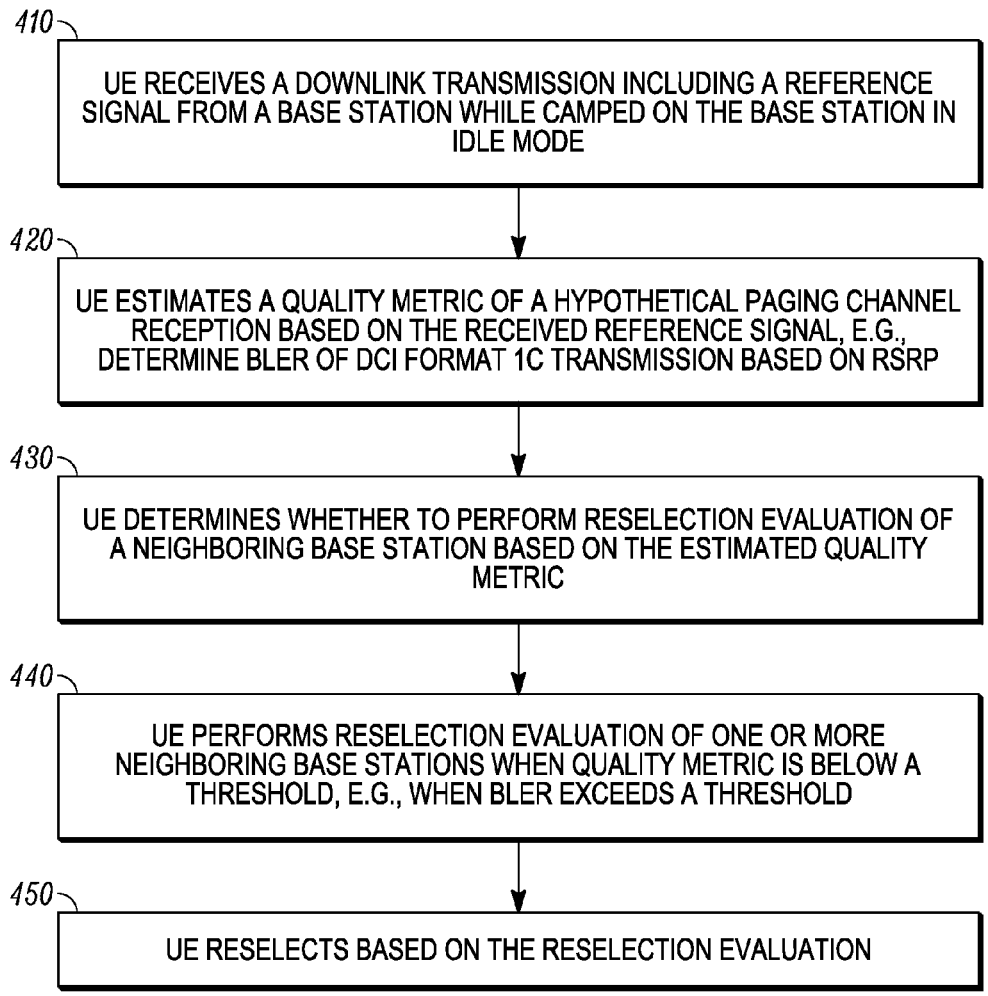
FIG. 4 illustrates process flow diagram.

In FIG. 4, at 402, an idle mode UE camped on a base station receives a downlink transmission including a reference signal from the base station. In some wireless communication systems, the reference signal is also referred to as a pilot signal.

In FIG. 3, the reference or pilot signals are located in a control region 320 of the sub-frame 310. In LTE Rel-8, the reference signals, PDCCH and other information are interleaved on symbols in the control region. Thus, according to this aspect of the disclosure, the UE receives one or more reference or pilot signals during one or more paging occasions. In one implementation, the controller of FIG. 2 is a digital processor configured by digital instructions stored in memory to cause the transceiver to receive the reference signal during the paging occasions while camped on the serving base station in idle mode. Alternatively, the functionality performed by the controller may be implemented by a hardware equivalent circuit.

In FIG. 4, at 404, the UE estimates a quality metric of a hypothetical paging channel reception based on the received reference signal, sometimes referred to as the cell-specific reference signal (CRS). In one embodiment, the UE measures the Reference Signal Received Power (RSRP) for a sub-band in the frequency dimension of the sub-frame for the corresponding paging occasion (PO). The term sub-band may refer to a group of sub-carriers or to a set of contiguous resource blocks. In one embodiment, the sub-band may correspond to one sub-carrier (15 kHz) or to a group of sub-carriers. More generally, a wideband measurement of the RSRP may be made by the UE. In one implementation, the controller of FIG. 2 is configured by digital instructions stored in memory to estimate the quality metric of the hypothetical paging channel.

In one implementation, the serving cell Reference Signal Received Power (RSRP) is used to predict the Block Error Rate (BLER) of a Downlink Control Information (DCI) format 1C reception. In other embodiments, the RSRP may be used to predict the BLER of other DCI formats. The BLER may be estimated using known methods such as Mean Mutual Information per Bit (MMIB), Effective Exponential Sum of SINR (EESM) among other mapping methods. In LTE Rel-8, the serving eNB transmits the antenna configuration to the UE employed for PDCCH transmissions, for example, SIMO, SFBC or SFBC-FSTD. The transmission configuration indicates how PDCCH codewords are physically transmitted on antenna ports and resource elements (REs) and this information is necessary for the UE to compute the DCI format 1C BLER.

Since, the DCI format 1C codeword can use variable power boost of PDCCH REs relative to CRS (−6 dB to 4 dB), aggregation levels (=1, 2, 4, 8 CCEs) and, number of OFDM symbols used for control transmission (=1, 2 or 3 symbols) the UE may assume certain default values (e.g., corresponding to the best-case coverage) or alternately, some or all of these parameters may be signaled by the serving (H)eNB. The UE either needs to make an assumption regarding the transmission parameters associated with DCI format 1C for all base stations (eNBs and not just HeNBs). Alternately, the parameters used by the serving eNB and neighbor eNBs have to be signaled by the eNB.

Alternatively, instead of predicting the BLER of a DCI format, the BLER of a pre-determined PDSCH payload or MCS level may be used and the principles for deducing the interference and the transmission parameters described above may be used. The BLER of a hypothetical PDSCH payload or an MCS level may be determined based on a reference signal to noise ratio (RS-SINR) evaluated at a sub-band (or sub-carrier) level.

In an alternative embodiment, the quality metric of the hypothetical paging channel reception is based on the reference signal and based on the estimated or measured interference from one or more neighboring base stations. In FIG. 1, for example, HeNB 106 interferes with transmissions from MeNB 102 in FIG. 1. In one embodiment, the quality metric is computed using the cell-specific reference signal (CRS). In addition to estimating sub-carrier SINR from the CRS, side information such as the transmission mode (e.g., SIMO, SFBC, and SFBC-FSTD), the number of control symbols, power boost used on PDCCH REs, BW, etc. are necessary for the computation of BLER. The sub-carriers on which the cell specific reference signal (CRS) is transmitted do not contain any other transmission from that cell. In one embodiment, within each sub-band (or a set of sub-carriers in a small time-frequency grid, e.g., 1 ms×90 kHz), the pilot power and interference subcarrier power is computed either by coherent/non-coherent processing or by employing channel estimation and canceling off the serving cell transmission from the received signal to estimate the interference. For example, channel estimation may be based on two 1-D MMSE estimators, which are separable in time and frequency, or based on a 2-D MMSE estimator. If coherent/non-coherent accumulation is used, then only the average RSRP and the average interference power over the sub-band may be computed. On the other hand, if channel estimation is employed, the sub-carrier level RSRP is determined. This processing is typically carried out on a sub-band basis. In one implementation, the sub-band has a granularity of 6 physical resource blocks (PRBs) for a downlink (DL) bandwidth (BW) of 10 MHz. The interference may only be estimated on a sub-frame or a portion of the sub-frames corresponding to the POs.

In one implementation, the BLER determination based on the RS-SINR typically involves the following steps. For the hypothesized transmission (e.g., DCI format 1C), the set of REs that "carry" the codeword in the time-frequency grid within the sub-frame is determined from the set of transmission parameters (e.g., aggregation level, number of control symbols, transmission mode—SIMO, SFBC, SFBC-FSTD, etc.). The channel coefficients corresponding to the set of REs that "carry" the hypothetical codeword is obtained. The average sub-band level interference power is determined, for example, by coherent/non-coherent accumulation. The channel coefficients corresponding to the set of REs that "carry" the hypothetical codeword is obtained from channel estimation and interpolation. From the two, the RS-SINR corresponding to the set of REs is computed. Any power boost necessary derived from the assumed transmission parameters (e.g., PDCCH-to-RS power boost=3 dB) is applied to the RS-SINR computed to obtain the PDCCH-SINR corresponding to the set of REs. A single metric like the EESM or MMIB is computed from the PDCCH-SINR computed above. The EESM/MMIB is a non-negative real number obtained from the set of PDCCH-SINR estimates corresponding to the PDCCH REs. A lookup table or a mapping function is used to determine BLER from EESM/MMIB.

In FIG. 4, at 430, the UE determines whether to perform reselection evaluation of one or more neighboring base stations based on the estimated quality metric. The reselection evaluation of neighboring base stations is generally performed when the estimated quality metric is below a threshold. In the exemplary embodiment where the quality metric is based on the BLER of the DCI format 1C or other transmission, the reselection evaluation is performed when the BLER exceeds a specified threshold, which may be determined based on empirical data or simulations. In one implementation, the quality metric may be expressed as (1—BLER). In one embodiment, the serving cell transmits the threshold on the quality metric to be used by the UE on its system information broadcast. In an alternative embodiment, the serving cell transmits the threshold to be used on a radio resource control (RRC) configuration message. In both cases, the UE is required to decode this information prior to triggering reselection evaluation.

In FIG. 4, at 440, the UE performs the reselection evaluation of neighboring base stations when the estimated quality metric is below a threshold. For the reselection evaluation, the quality metric of a hypothetical paging channel reception is estimated for each of the neighboring base stations based on a corresponding reference signal of the neighboring base station and based on the corresponding interference for the neighboring base station. The quality metric of the neighboring base stations may be estimated during the paging occasions as discussed above. In some instances the UE may estimate the quality metric of the neighboring base stations more frequently. Here too, the quality metric of the hypothetical paging channel for each of the neighboring base stations may be estimated by determining the BLER for a DCI format 1C transmission based on RSRP or one of the alternatives discussed above.

In FIG. 4, at 450, the UE reselects based on the reselection evaluation. In one instance, the UE reselects to a neighboring base station having a highest ranked hypothetical paging reception, assuming reselection is allowed. For example, the UE may reselect to a highest ranked neighboring base station on a carrier that is the same as a carrier of the serving base station if the neighboring base station is allowed. If a highest ranked neighboring base station is not allowed, the UE reselects to another neighboring base station on a carrier that is different than a carrier of the serving base station. In one implementation, the controller of FIG. 2 is configured by digital instructions stored in memory to perform the reselection evaluation and reselection. An alternate ranking criterion could include ranking based on reference signal received power corresponding to the neighboring base station. The UE reselects to the neighboring base station with the highest ranked reference signal received power if the base station is allowed.

In an alternative embodiment, the UE receives a downlink transmission from the base station including a system information broadcast (SIB) message. In this embodiment, the UE estimates the quality metric of a hypothetical paging channel reception based on the SIB message instead of the reference signal. SIB-1 has a TTI of 80 ms (transmission/re-transmissions). The repetition periodicity of other SIB-x (x=2, etc.) can be determined from SIB-1. The SIB-x are addressed by DCI format 1C. The UE can physically try to decode the SIB-x codewords and from the failed CRC checks, and can compute the BLER associated with DCI format 1C transmission (assuming that the DCI format 1C error event dominates the overall error event and that PDSCH BLER is not the bottleneck).

In one embodiment the UE reselects to the highest ranked neighboring base station based on ranking criterion. The ranking criterion could include reference signal received power or quality of a hypothetical paging channel reception, if the neighboring base station remains the highest ranked base station for a certain duration of time. The duration of time for evaluating whether the neighboring base station is the highest ranked base station may be signaled by the serving base station.

The UE also computes BLER corresponding to hypothetical codeword transmissions from non-serving cell (denoted as eNB2, eNB3, etc.). For this, the UE may need to make assumptions on where the POs will be and in addition may need to read the MIB/SIB-1/SIB-2/etc. of eNB2, eNB3, etc. to determine various parameters like the DL BW, transmit antenna configuration and paging channel configuration (if such a thing is defined in LTE Release 9), etc. Alternately, the serving cell eNB1 may indicate the necessary parameters as part of the neighbor cell list information. If the BLER estimate for eNB1 exceeds the threshold, then UE reselects to the allowed non-serving eNB (i.e., one cell among eNB2, eNB3, etc.) that has the lowest BLER estimate. This alternative allows for reselection to a cell that enables best paging channel reception for a UE in idle mode.

In an alternate embodiment, the UE estimates the quality metric of a hypothetical paging channel reception for each of the neighboring base stations and the serving base station based on the block error rate associated with the DCI format 1C transmission associated with the corresponding SIB message for each of the neighboring base stations and the serving base station, respectively. It is not necessary for the UE to decode the SIB message. The UE is only required to decode the DCI format 1C transmission addressing the SIB message transmission to estimate the BLER.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication device, the method comprising:
    receiving, at the device, a downlink transmission including a reference signal from a base station while camped on the base station in idle mode;
    estimating, at the device, a quality metric of a hypothetical paging channel reception based on the reference signal, wherein the quality metric is an indicator of an error rate of paging channel reception;
    determining whether to perform reselection evaluation of a neighboring base station by the device based on the estimated quality metric.

2. The method of claim 1,
    estimating, at the device, interference due to transmissions from neighboring base stations,
    estimating the quality metric of the hypothetical paging channel reception based on the reference signal and based on the estimated interference.

3. The method of claim 1,
    receiving the downlink transmission from the base station including the reference signal during paging occasions while camped on the base station;
    estimating, at the device, interference due to transmissions from the neighboring base stations during the paging occasions,
    estimating the quality metric of the hypothetical paging channel reception based on the reference signal and based on the estimated interference.

4. The method of claim 1 further comprising,
    performing reselection evaluation of neighboring base stations when the estimated quality metric is below a threshold by
        estimating, at the device, interference associated with transmission from each of the neighboring base stations, and
        estimating, at the device, a quality metric of the hypothetical paging channel reception for each of the neighboring base stations based on a corresponding reference signal of the neighboring base station and based on the corresponding interference for the neighboring base station; and
    reselecting to the neighboring base station having a highest ranked hypothetical paging reception.

5. The method of claim 1, performing reselection evaluation of neighboring base stations when the estimated quality metric is below a threshold.

6. The method of claim 5, where the threshold is received from the base station on a system information broadcast.

7. The method of claim 5, where the threshold is received from the base station on a radio resource control message.

8. The method of claim 5 further comprising,
    performing reselection evaluation of neighboring base stations includes
        estimating, at the device, interference associated with transmission from each of the neighboring base stations, and
        estimating, at the device, a quality metric of the hypothetical paging channel reception for each of the neighboring base stations based on a corresponding reference signal of the neighboring base station and based on the corresponding interference of the neighboring base station; and
    reselecting to the neighboring base station having a highest ranked hypothetical paging reception.

9. The method of claim 1 further comprising
    performing reselection evaluation of neighboring base stations when the estimated quality metric is below a threshold;
    if a highest ranked neighboring base station is not allowed, reselecting to another neighboring base station on a carrier that is different than a carrier of the base station.

10. The method of claim 1 further comprising
    performing reselection evaluation of neighboring base stations when the estimated quality metric is below a threshold;
    reselecting to a highest ranked neighboring base station on a carrier that is the same as a carrier of the base station if the neighboring base station is allowed.

11. The method of claim 1 further comprising,
    performing reselection evaluation of neighboring base stations when the estimated quality metric is below a threshold by
        estimating, at the device, reference signal received power for each of the neighboring base stations; and
    reselecting to the neighboring base station having a highest ranked reference signal received power.

12. A wireless communication device comprising:
    a transceiver,
    a controller coupled to the transceiver,
    the controller configured to cause the transceiver to receive a downlink transmission including a reference signal from a base station while camped on the base station in idle mode,
    the controller configured to estimate a quality metric of a hypothetical paging channel reception based on the reference signal, wherein the quality metric is an indicator of an error rate of paging channel reception, and
    the controller configured to determine whether to perform reselection evaluation of a neighboring base station by the device based on the estimated quality metric.

13. The device of claim 12, the controller configured to estimate the quality metric of the hypothetical paging channel reception based on the reference signal and based on estimated interference.

14. The device of claim 12,
the controller configured to cause the transceiver to receive the downlink transmission from the base station including the reference signal during paging occasions while camped on the base station,
the controller configured to estimate interference during the paging occasions,
the controller configured to estimate the quality metric of the hypothetical paging channel reception based on the reference signal and based on the estimated interference.

15. The device of claim 14 further comprising,
the controller configured to perform reselection evaluation of neighboring base stations when the estimated quality metric is below a threshold by
estimating, at the device, interference associated with transmission from each of the neighboring base stations, and
estimating, at the device, a quality metric of a hypothetical paging channel reception for each of the neighboring base stations based on a corresponding reference signal of the neighboring base station and based on the corresponding interference for the neighboring base station; and
the controller configured to reselect to a highest ranked neighboring base station.

16. The device of claim 12,
the controller configured to perform reselection evaluation of neighboring base stations when the estimated quality metric is below a threshold;
the controller configured reselect to another neighboring base station on a carrier that is different than a carrier of the base station if a highest ranked neighboring base station is not allowed.

17. The device of claim 12,
the controller configured to perform reselection evaluation of neighboring base stations when the estimated quality metric is below a threshold,
the controller configured to reselect to a highest ranked neighboring base station on a carrier that is the same as a carrier of the base station if the neighboring base station is allowed.

18. A method in a wireless communication device, the method comprising:
receiving, at the device, a downlink transmission including a system information broadcast (SIB) message;
estimating, at the device while camped on a base station in idle mode, a quality metric of a hypothetical paging channel reception based on the SIB message;
determining whether to perform reselection evaluation of a neighboring base station by the device based on the estimated quality metric.

19. The method of claim 18 further comprising,
performing reselection evaluation of neighboring base stations when the estimated quality metric is below a threshold by
estimating, at the device, interference associated with transmission from each of the neighboring base stations, and
estimating, at the device, a quality metric of a hypothetical paging channel reception for each of the neighboring base stations based on the corresponding interference for the neighboring base station; and
reselecting to the neighboring base station having a highest ranked hypothetical paging reception.

20. The method of claim 18 further comprising,
performing reselection evaluation of neighboring base stations when the estimated quality metric is below a threshold by
estimating, at the device, reference signal received power for each of the neighboring base stations; and
reselecting to the neighboring base station having a highest ranked reference signal received power.

21. The method of claim 1 further comprising
receiving one of a system information message, a master information block, a neighbor cell list configuration; and
determining any one of a DL bandwidth, a transmit antenna configuration or a paging channel configuration based on any one of a system information message, a master information block, or a neighbor cell list configuration.

22. The method of claim 1, further comprising hypothesizing the reception of a paging channel from the base station,
wherein the quality metric comprises a block error rate,
wherein estimating comprises estimating, at the device, the block error rate of the hypothesized paging channel reception based on the reference signal, and
wherein determining comprises determining whether to perform reselection evaluation of a neighboring base station by the device based on the estimated block error rate.

23. The device of claim 12,
wherein the controller is configured to hypothesize the reception of a paging channel from the base station,
wherein the quality metric comprises a block error rate,
wherein the controller is configured to estimate the block error rate of the hypothesized paging channel reception based on the reference signal, and
wherein the controller is configured to determine whether to perform reselection evaluation of a neighboring base station by the device based on the estimated block error rate.

24. The method of claim 18 further comprising, hypothesizing the reception of a paging channel from the base station,
wherein the quality metric comprises a block error rate,
wherein estimating comprises estimating, at the device while camped on a base station in idle mode, a block error rate of the hypothesized paging channel reception based on the SIB message, and
wherein determining comprises determining whether to perform reselection evaluation of a neighboring base station by the device based on the estimated block error rate.

* * * * *